Aug. 16, 1932.  K. E. LYMAN  1,872,311
SPRING SUSPENSION
Filed Aug. 15, 1927  4 Sheets-Sheet 1
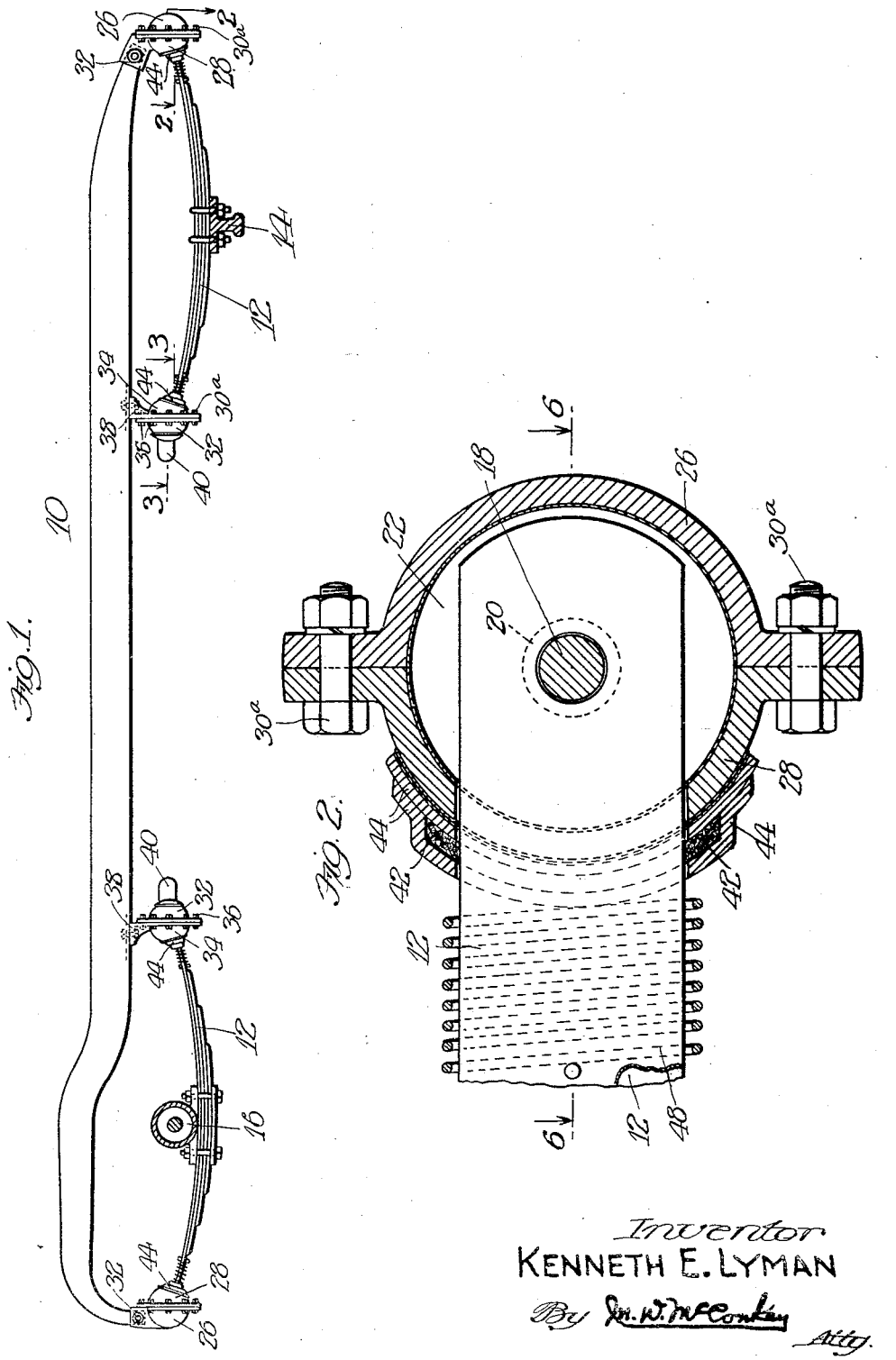
Inventor
KENNETH E. LYMAN Aug. 16, 1932.    K. E. LYMAN    1,872,311
SPRING SUSPENSION
Filed Aug. 15, 1927    4 Sheets-Sheet 2

Inventor
KENNETH E. LYMAN
By M. W. McConkey
Atty.

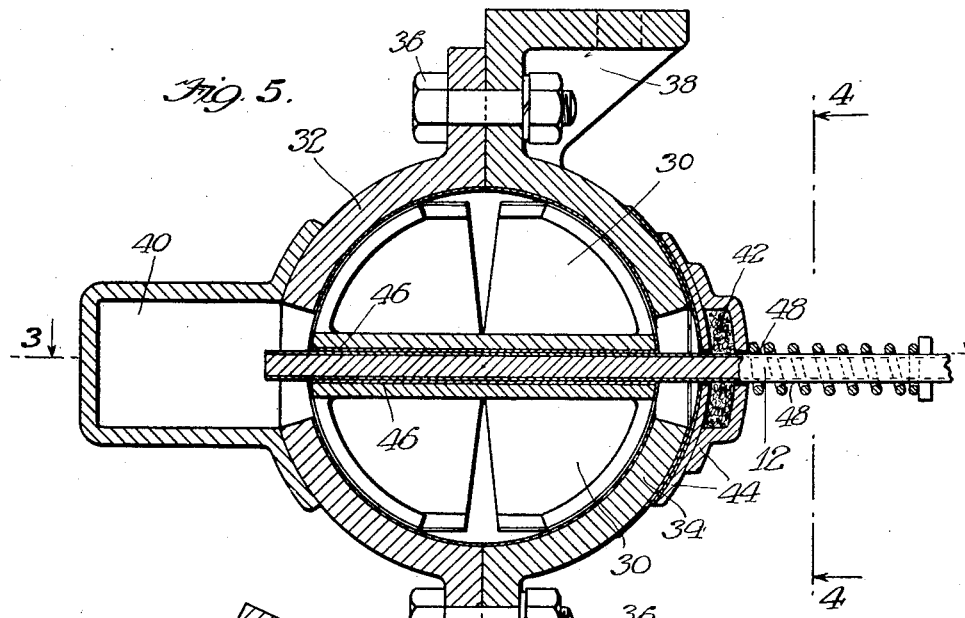
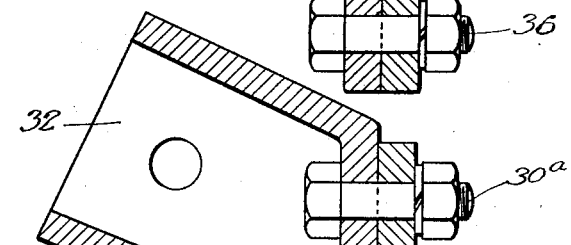
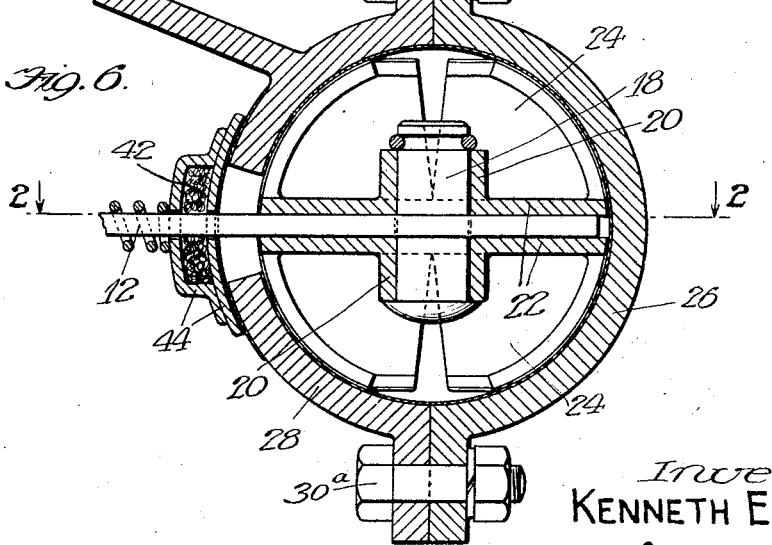

Aug. 16, 1932.  K. E. LYMAN  1,872,311
SPRING SUSPENSION
Filed Aug. 15, 1927  4 Sheets-Sheet 4

Inventor
KENNETH E. LYMAN
By M. W. McConkey
Atty

Patented Aug. 16, 1932

1,872,311

UNITED STATES PATENT OFFICE

KENNETH E. LYMAN, OF CHICAGO, ILLINOIS, ASSIGNOR TO BENDIX BRAKE COMPANY, OF SOUTH BEND, INDIANA, A CORPORATION OF ILLINOIS

SPRING SUSPENSION

Application filed August 15, 1927. Serial No. 212,979.

This invention relates to spring suspensions for vehicles and is illustrated as embodied in an automobile spring suspension.

One important object of the invention is to minimize the wear of the spring mounting and to obviate the necessity for lubrication by plating or otherwise coating the relatively movable parts with metallic chromium. This gives an extremely hard surface which undergoes very little wear and which requires no lubrication.

Another feature of novelty relates to mounting the end of the spring slidably between the flat faces of novel semi-spherical members which are received in a hollow internally-spherical bracket secured to the vehicle frame.

The above and other objects and features of the invention, including various novel details of construction, will be apparent from the following description of one illustrative embodiment shown in the accompanying drawings, in which:

Figure 1 is a side elevation of the chassis frame, and of the front and rear spring suspensions, with the front and rear axles shown in vertical section;

Figure 2 is a section through one of the spring supports substantially on the line 2—2 of Figure 1;

Figure 5 is a section through the spring support of Figure 3 substantially on the line 5—5 of Figure 3;

Figure 6 is a section through the spring support of Figure 2 substantially on the line 6—6 of Figure 2;

Figure 3:
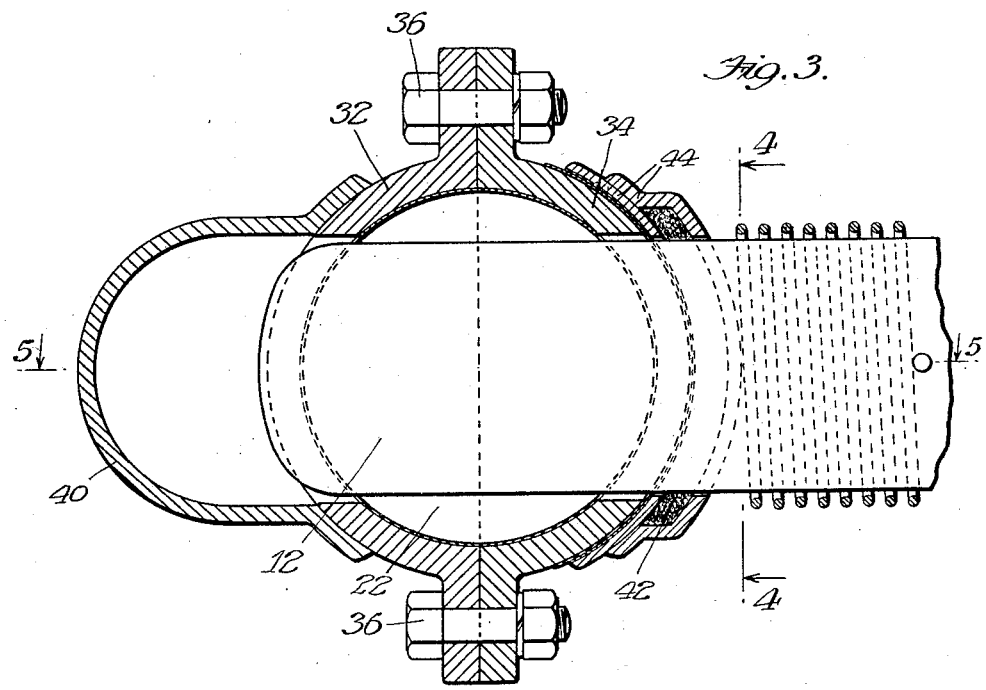
Figure 3 is a corresponding section through another of the spring supports substantially on the line 3—3 of Figure 1.
Figure 4:
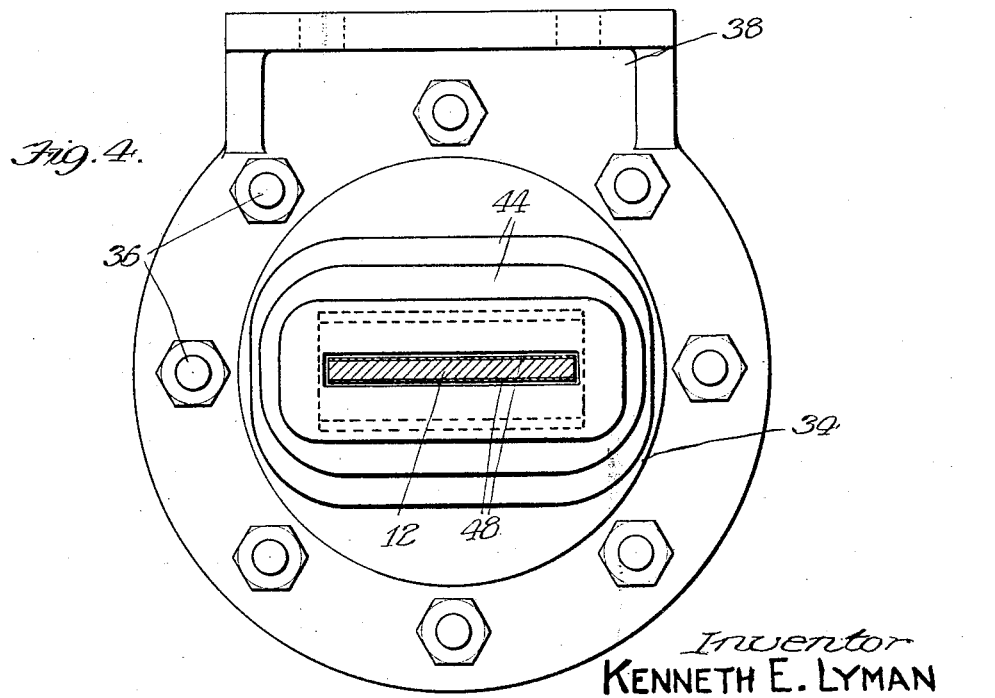
Figure 4 is a section on the line 4—4 of Figure 3 and showing the spring support in front elevation.
Figure 7:
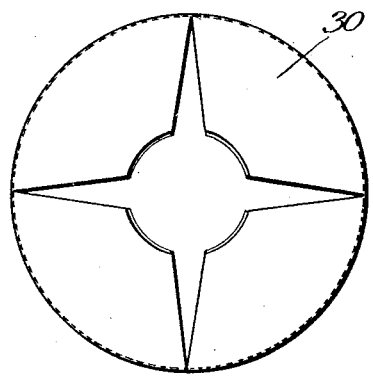
Figure 8:
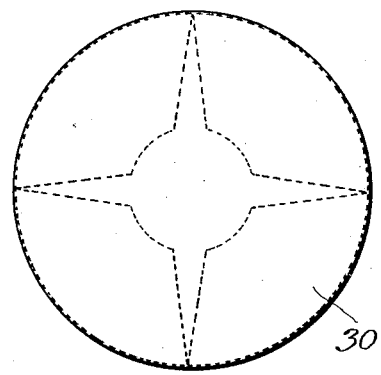
Figure 9:
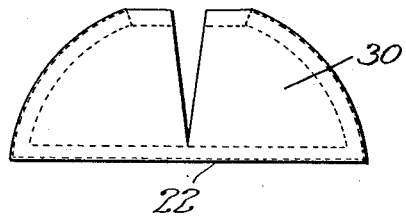
Figure 10:
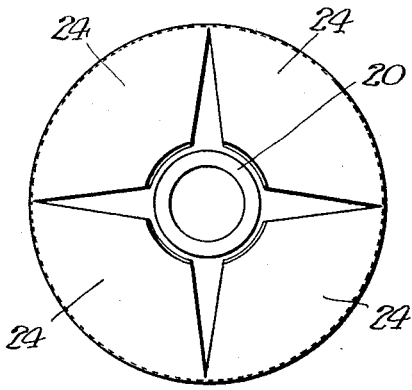
Figure 11:
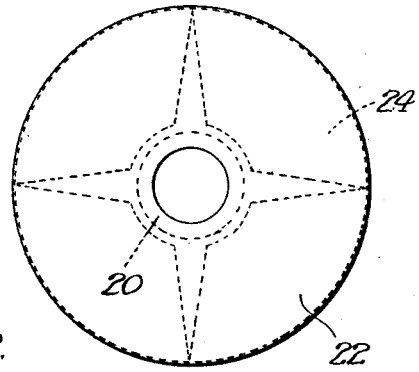
Figure 12:
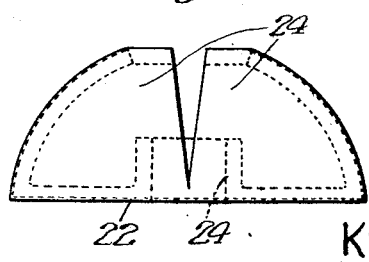

Figures 7, 8, and 9 are respectively top plan, bottom plan, and side elevational views of one of the semi-spherical members of the spring support of Figures 3, 4, and 5; and Figures 10, 11, and 12 are respectively top plan, bottom plan, and side elevational views of one of the semi-spherical members of the spring support of Figures 2 and 6.

The construction illustrated includes a chassis frame 10 arranged to be supported by front and rear semi-elliptic springs 12 on a front axle 14 and a rear axle 16. The present invention relates primarily to the attachment of the springs 12 to the chassis frame.

One end of each of the semi-elliptic springs 12 is secured against lengthwise movement by a bolt or pin 18 passing through an opening in the end of the spring and through the bosses 20 drawn centrally of the bases 22 of semi-spherical spring embracing members one of which is shown in detail in Figures 10, 11, and 12. The base of each of these members forms a flat spring-engaging face, while the upper part is in the form of sectors or tongues 24 so formed as to make the exterior of the device substantially semi-spherical. The two spring-embracing devices, with the end of the spring, are mounted in an internally spherical hollow bracket formed in two pieces 26 and 28 secured together by fastenings such as bolts 30 and formed with an extension 32 for attachment to the chassis frame 10.

The other end of each of the springs is slidably received between the flat face of two semi-spherical members 30 which are shown in detail in Figures 7, 8, and 9, and which are substantially the same as those described above except that they are not formed with bosses 20 for the pins or bolts 18. These drawn semi-spherical members, with the end of the spring, are housed in an internally-spherical hollow bracket formed of two pieces 32 and 34 secured together by fastenings such as bolts 36 and which are formed with brackets 38 to be attached to the chassis frame 10. In order to permit sufficient lengthwise movement of the spring, the part 32 of the bracket is formed with an opening for the end of the spring which may be closed by a housing 40. The housing 40 is in the form of a drawn stamping or the like spot-welded or otherwise secured to the part 32 of the bracket.

Both the brackets may be provided with suitable packing material 42 held by stampings 44 secured to the brackets.

According to an important feature of the invention, lubrication of the relatively movable parts is obviated, and the wear is very greatly minimized, by plating or otherwise providing the relatively movable surfaces with coatings of metallic chromium. As best shown in Figure 5, the flat faces of the stampings 30 may be provided with such coatings 46 of metallic chromium, while if desired the spring may be provided on opposite sides with coatings 48 of metallic chromium.

While one illustrative embodiment of the invention has been described in detail, it is not my intention to limit its scope to that particular embodiment or otherwise than by the terms of the appended claims.

I claim:

1. A spring suspension including a leaf spring, an internally spherical hollow bracket, and a pair of semi-spherical members provided with registering bosses, said members housed within said bracket.

2. A spring suspension including a ball and socket joint provided with flat faced mating ball sections arranged back to back each section comprising tongues in its spherical surface, and a bolt receiving boss projecting from its flat surface.

3. A spring suspension including a ball and socket joint provided with a flat faced mating ball sections arranged back to back each section comprising tongues in its spherical surface.

4. A suspension for a leaf spring comprising two members each having a flat spring-engaging face and integral tongues forming a hemispherical bearing surface, and an internally spherical bearing member cooperating with said bearing surfaces.

5. A suspension for a leaf spring comprising two members each having a flat face adapted to contact with the spring in sliding relation and a plurality of spaced tongues formed integral with the flat face and together forming a hemispherical bearing surface, and a bracket having a spherical inner surface cooperating with the bearing surfaces.

In testimony whereof, I have hereunto signed my name.

KENNETH E. LYMAN.